(12) United States Patent
Bao et al.

(10) Patent No.: US 9,007,887 B2
(45) Date of Patent: Apr. 14, 2015

(54) WIRELESS COMMUNICATION SYSTEM AND COMMUNICATION METHOD THEREFOR

(75) Inventors: Dongshan Bao, Beijing (CN); Lijun Pan, Beijing (CN); Shenfa Liu, Beijing (CN); Jing Wang, Beijing (CN); Jun Lei, Beijing (CN); Zhigang Yan, Beijing (CN)

(73) Assignee: Beijing NuFront Mobile Multimedia Technology Co. Ltd, Beijing (CN)

( * ) Notice: Subject to any disclaimer, the term of this patent is extended or adjusted under 35 U.S.C. 154(b) by 24 days.

(21) Appl. No.: 14/007,529

(22) PCT Filed: Mar. 23, 2012

(86) PCT No.: PCT/CN2012/072870
§ 371 (c)(1),
(2), (4) Date: Sep. 25, 2013

(87) PCT Pub. No.: WO2012/130087
PCT Pub. Date: Oct. 4, 2012

(65) Prior Publication Data
US 2014/0022884 A1    Jan. 23, 2014

(30) Foreign Application Priority Data
Mar. 25, 2011    (CN) .......................... 2011 1 0074434

(51) Int. Cl.
  *H04J 11/00*    (2006.01)
  *H04L 27/26*    (2006.01)
  *H04W 74/08*    (2009.01)
  *H04J 13/10*    (2011.01)

(52) U.S. Cl.
  CPC ....... *H04L 27/2602* (2013.01); *H04W 74/0833* (2013.01); *H04J 13/10* (2013.01); *H04L 27/2613* (2013.01)

(58) Field of Classification Search
None
See application file for complete search history.

(56) References Cited

U.S. PATENT DOCUMENTS

| | | | | |
|---|---|---|---|---|
| 7,769,119 | B2* | 8/2010 | Chun et al. | 375/354 |
| 8,675,481 | B2* | 3/2014 | Ko et al. | 370/229 |
| 8,717,975 | B2* | 5/2014 | Sun et al. | 370/328 |
| 8,755,365 | B2* | 6/2014 | Lee et al. | 370/338 |
| 8,862,157 | B2* | 10/2014 | Han et al. | 455/456.4 |
| 8,908,495 | B2* | 12/2014 | Takaoka et al. | 370/210 |
| 2005/0094550 | A1* | 5/2005 | Huh et al. | 370/203 |

(Continued)

*Primary Examiner* — Clemence Han
(74) *Attorney, Agent, or Firm* — Crain, Caton & James

(57) ABSTRACT

Disclosed is a communication method comprising: determining the length, N, of a random access sequence on the basis of system configuration information, where N is less than or equal to the number of available subcarriers; determining a cyclic shift parameter collection and a cyclic prefix on the basis of a system coverage area as designed; acquiring and on the basis of a MAC address of a central access point (CAP), or of a physical layer identifier thereof, and of a predetermined generator polynomial, generating a PN sequence of length N, then constellation-mapping and subcarrier-mapping the PN sequence; cyclically shifting, on the basis of the cyclic shift parameter, the constellation-mapped and subcarrier-mapped sequence, then orthogonally transforming the cyclically shifted sequence; acquiring the sequence needed, adding the cyclic prefix thereto, acquiring a random access signal; and performing subsequent processing then transmitting to a receiving-end. Also provided in the present invention is a corresponding communication system. The present invention provides improved support for wireless communication system random access, and improved system stability and reliability.

11 Claims, 5 Drawing Sheets

(56) References Cited

U.S. PATENT DOCUMENTS

| | | | |
|---|---|---|---|
| 2005/0099939 A1* | 5/2005 | Huh et al. ............. 370/210 |
| 2006/0098569 A1* | 5/2006 | Han et al. ............. 370/208 |
| 2006/0120270 A1* | 6/2006 | Han et al. ............. 370/208 |
| 2010/0091642 A1* | 4/2010 | Hwang ............. 370/210 |
| 2012/0057449 A1* | 3/2012 | Takaoka et al. ............. 370/210 |

* cited by examiner

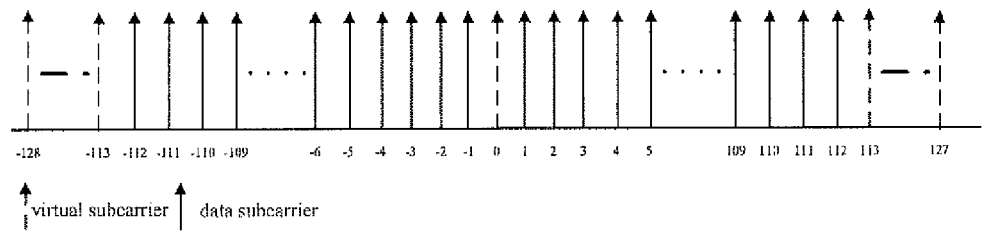
Fig.6
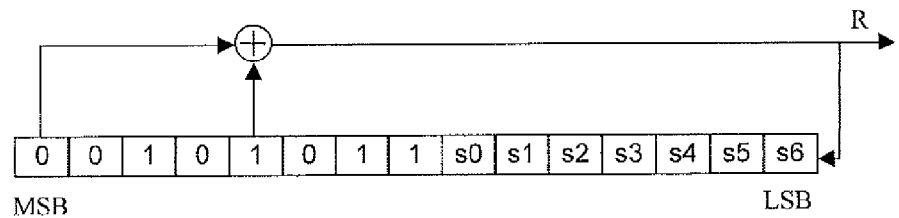
Fig.7
Fig.8

WIRELESS COMMUNICATION SYSTEM AND COMMUNICATION METHOD THEREFOR

CROSS-REFERENCE TO RELATED APPLICATION

This application claims priority from PCT Patent Application No. PCT/CN2012/072870 filed on Mar. 23, 2012, which claims priority to Chinese Patent Application No. 201110074434.2 filed on Mar. 25, 2011 and titled "MID-SHORT DISTANCE WIRELESS COMMUNICATION SYSTEM AND COMMUNICATION METHOD", both of which are incorporated herein by reference.

TECHNICAL FIELD

The present invention relates to the field of wireless communication and network technologies, particularly, relates to a wireless communication system and a communication method therefor.

TECHNICAL BACKGROUND

In the traditional wireless local area network system (of IEEE 802.11 series, for example), a random access sequence is not required for system accessing; instead, in the period of random competition, all the user stations (STAs) transmit authentication request frames and relevance request frames successively to the detected access point (AP) on the basis of Carrier Sense Multiple Access with Collision Avoidance (CSMA/CA) mechanism, to achieve the function of system access. Such scheme is advantageous for its easy implement, and a dedicated design is not required in the physical layer; however, the drawback is that more OFDM symbols are occupied because the authentication request frame and the relevance request frame are both MAC frames, and both of them require for the long short training symbols, the control symbols, the frame control information, etc., so that the collision probability would rise with the increasing of users, thus resulting in a low system efficiency.

Both a Long Term Evolution (LTE) system and a Worldwide Interoperability for Microwave Access (Wimax) system are based on centralized scheduling and adopt specially designed random access sequences to assist for the process of random access. However, because both of these systems are designed for the scenario of mobile communication with relatively large coverage (having a coverage radius from hundreds of meters to tens of kilometers), the random access sequences employed by the systems are not applicable for the scenario of mid-short distance wireless communication.

FIG. 1 and Table 1 respectively show the format of the random access sequence of an LTE system and the supported specific parameters thereof. The random access sequence contains a cyclic prefix (CP) and a sequence body, where the short training sequence (i.e. Zadoff-Chu sequence) is adopted as the sequence body. Currently, the widely concerned Zadoff-Chu sequence and Generalized Chirp Like (GCL) sequence are both from the category of CAZAC, and the so-called CAZAC sequence is a non-binary complex sequence with the property of a constant amplitude and zero autocorrelation.

TABLE 1

| Format | $T_{CP}$ | $T_{SEQ}$ |
|--------|----------|-----------|
| 0 | 3168 | 24576 |
| 1 | 21024 | 24576 |

TABLE 1-continued

| Format | $T_{CP}$ | $T_{SEQ}$ |
|--------|----------|-----------|
| 2 | 6240 | 49152 |
| 3 | 21024 | 49152 |
| 4* | 448 | 4096 |

Wherein, the format 4 is applicable only when the length of the uplink pilot time slot (UpPTS) in the TDD frame structure is 4384 or 5120.

FIG. 2 illustrates an example of a random access sequence format employed in Wimax system. 2 OFDM symbols are employed in this example as the random access sequence, and it is cited in the specification of the Wimax system that 2 or 4 OFDM symbols may be employed as the random access sequence. The sequence body is formed by a PN sequence.

Table 2 shows various CP lengths $T_{CP}$ supported by the Wimax system.

TABLE 2

| Format | $T_{CP}$ | $T_{SEQ}$ |
|--------|----------|-----------|
| 0 | 64/256 | 256/1024 |
| 1 | 32/128 | 256/1024 |
| 2 | 16/64 | 256/1024 |
| 3 | 8/32 | 256/1024 |

Taking the present wireless local area network (802.11) system as an example, the length of an OFDM symbol thereof is 3.2 as, the length $T_{CP}$ of the cyclic prefix CP is 0.8 μs, the interval between subcarriers is 312.5 KHz, the number of available subcarriers is 52 in the case of a 20 M bandwidth, and the size of the Fast Fourier Transform FFT is 64. It could be derived from the parameters of the physical layer that: neither the random access sequences of the LTE system nor that of the Wimax system can be directly introduced into the present wireless local area network system, and the random access sequence needs to be re-designed accordingly.

SUMMARY OF THE INVENTION

The present invention provides a wireless communication system and a communication method thereof, to provide improved support for random accesses to a wireless communication system, and improve system stability and reliability.

The invention provides a communication method for a wireless communication system, and the method includes:

determining the length N of a random access sequence on the basis of system configuration information, wherein $N \leq N_u$ and $N_u$ denotes the number of available subcarriers;

determining a collection of cyclic shift parameters $\{\delta_{CS}\}$ and a cyclic prefix CP on the basis of a system coverage area as designed;

acquiring the media access control layer MAC address or a physical layer identifier ID of a central access point CAP, generating a PN sequence of a length N on the basis of the MAC address or the physical layer identifier ID of the CAP and a predetermined generator polynomial, and then constellation-mapping and subcarrier-mapping the PN sequence;

cyclically shifting the constellation-mapped and subcarrier-mapped sequence on the basis of the cyclic shift parameters $\{\delta_{CS}\}$, and orthogonally transforming the cyclically shifted sequence to acquire the desired sequence; or orthogonally transforming the subcarrier-mapped sequence, and cyclically shifting the transformed sequence on the basis of the cyclic shift parameters $\{\delta_{CS}\}$ to acquire the desired sequence;

adding the cyclic prefix CP to the desired sequence as acquired, to acquire a random access signal in the time domain; and performing subsequent processing on the random access signal, and then transmitting the processed random access signal to a receiving end.

The invention provides a wireless communication system including:

a setting unit, used to determine the length N of a random access sequence on the basis of system configuration information, wherein N≤$N_u$ and $N_u$ denotes the number of available subcarriers;

a cyclic shift parameter selection unit, used to determine a collection of cyclic shift parameters $\{\delta_{CS}\}$ on the basis of the system configuration information;

an acquiring unit, used to acquire a MAC address or a physical layer identifier ID of a central access point CAP;

a pseudo-random sequence generating unit, used to generate a PN sequence of a length N on the basis of the MAC address or the physical layer identifier ID of the CAP and a predetermined generator polynomial;

a constellation-mapping unit, used to constellation-map the generated PN sequence to acquire a new sequence, and provide the new sequence to a subcarrier-mapping unit;

the subcarrier-mapping unit, used to subcarrier-map the PN sequence;

a first cyclic shift processing unit, used to cyclically shift the subcarrier-mapped sequence on the basis of the cyclic shift parameters $\{\delta_{CS}\}$; or a second cyclic shift processing unit, used to cyclically shift the orthogonally transformed sequence on the basis of the cyclic shift parameters $\{\delta_{CS}\}$, to acquire the desired sequence;

a transforming unit, used to orthogonally transform the subcarrier-mapped sequence, and provide the transformed sequence to the second cyclic shift processing unit; or orthogonally transform the sequence cyclically shifted by the first cyclic shift processing unit, to acquire the desired sequence;

an access signal generating unit, used to add a cyclic prefix CP to the desired sequence as acquired, to acquire the time-domain random access signal;

a modulation unit, used to modulate the random access signal; and a transmitting unit, used to transmit the modulated random access signal to a receiving end.

In brief, in the wireless communication system and the communication method thereof as provided in the present invention, the PN sequence and the cyclic shift sequence thereof are employed as the random access sequence. With the dedicated design of the random access sequence and the adjustment of the sequence length, the cyclic shift parameter, the cyclic shift length, etc., improved supports are provided for the random access to the wireless communication system, especially the mid-short distance wireless communication system, and system stability and reliability is improved.

BRIEF DESCRIPTION OF THE DRAWINGS

FIG. 6 illustrates the subcarrier mapping employed in an embodiment of the present invention;

FIG. 7 illustrates the system frame structure in the wireless communication system in an embodiment of the present invention;

FIG. 8 is a block diagram showing the generation of the PN sequence provided in another embodiment of the present invention.

DETAILED DESCRIPTION

In view of the features of the wireless communication system, new design criteria should be introduced to achieve improved random access performance and lowered complexity and power consumption of the receiver. To this end, the present invention provides a communication method, which relates to the design of the random access sequence, and employs a PN sequence and the cyclic shift sequence thereof as the random access sequence. The adjustment on the sequence length, the cyclic shift parameter, the cyclic prefix length, etc. can provide improved supports for the random access to the wireless communication system, especially for the random access to the mid-short distance wireless communication system.

Hereinafter, an access point is called Central Access Point (CAP), and a user station is called Station (STA) in the present invention.

Figure 1:
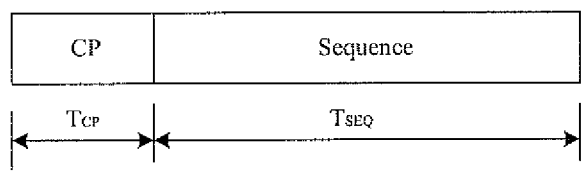
FIG. 1 illustrates the random access sequence employed in the LTE system of the prior art.
Figure 2:
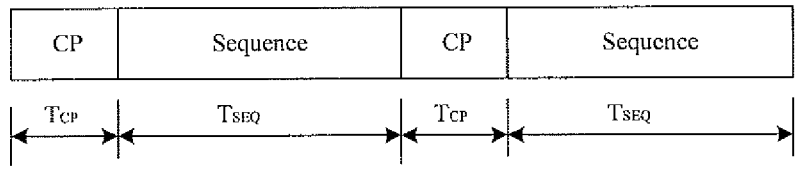
FIG. 2 illustrates the random access sequence employed in the Wimax system of the prior art.
Figure 3:
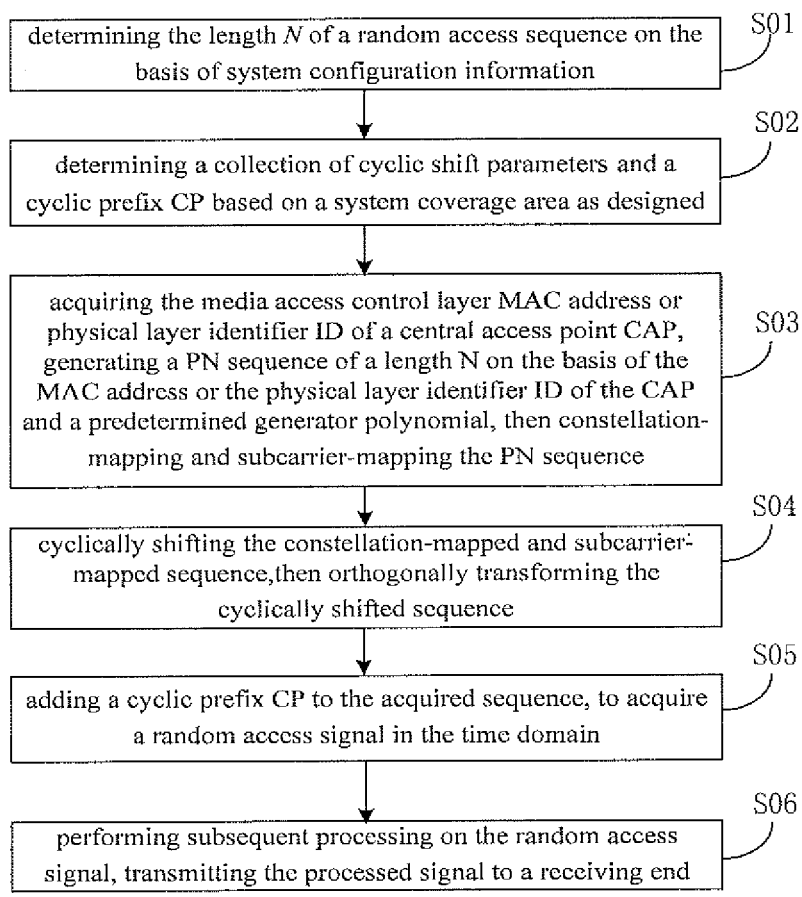
FIG. 3 is the flowchart of the communication method of the wireless system provided in the present invention.

Referring to FIG. 3, the present invention provides a communication method for the wireless system, and the method includes the following steps S01-S06.

At step S01, the length N of a random access sequence is determined on the basis of system configuration information, where N≤$N_u$ and $N_u$ denotes the number of available subcarriers; for example, the value of N could be $$\frac{N_u}{4}, \frac{N_u}{2}, N_u,$$

etc.

At step S02, a collection of cyclic shift parameters $\{\delta_{CS}\}$ and a cyclic prefix CP are determined on the basis of a system coverage area as designed.

Determining the collection of cyclic shift parameters $\{\delta_{CS}\}$ on the basis of a system coverage area as designed specifically includes:

1) estimating the backhaul delay on the basis of the system coverage area, and estimating the channel delay spread;

2) determining the corresponding time-domain sample number on the basis of the backhaul delay and the channel delay spread;

3) selecting a value greater than or equal to the time-domain sample number as the cyclic shift interval between the adjacent sequences; and 4) designing the collection of cyclic shift parameters $\{\delta_{CS}\}$ on the basis of the cyclic shift interval.

Determining a cyclic prefix CP on the basis of the system coverage area as designed specifically includes:

a) estimating the backhaul delay on the basis of the system coverage area, and estimating the channel delay spread; and b) setting the value of the cyclic prefix CP to be greater than the sum of the backhaul delay and the channel delay spread.

At step S03, the MAC address or the physical layer identifier ID of a CAP are acquired, a PN sequence of a length N is generated on the basis of the MAC address or the physical layer identifier ID of the CAP and a predetermined generator polynomial, and then the PN sequence is constellation-mapped and subcarrier-mapped.

A Zadoff-Chu sequence together with the cyclic shift is employed as the access sequence in the LTE system, while a PN sequence is employed as the access sequence in IEEE 802.16. In the present invention, the PN sequence together with the cyclic shift is employed as the access sequence for reasons that: 1) pre-coding is not taken in the transmission of system uplink data to reduce the Peak to Average Power Ratio (PAPR), so the Zadoff-Chu sequence is not employed as the access sequence; 2) the cyclic shift can reduce the implement complexity of the detecting in the CAP, for example, if the number of elements in the collection of cyclic shift parameters $\{\delta_{CS}\}$ is 8, the complexity would be reduced to 8 times; and 3) if frequency domain detection is utilized, less logical resources will be utilized if the PN sequence instead of the Zadoff-Chu sequence is employed. Thus, the cost of the corresponding device may be reduced.

At step S04, the constellation-mapped and subcarrier-mapped sequence is cyclically shifted and then orthogonally transformed, by for example Inverse Fast Fourier Transform (IFFT) or other transform method. Here, the cyclic shift may be performed in the frequency domain or the time domain.

The cyclic shift in the frequency domain includes:

first, cyclically shifting the constellation-mapped and subcarrier-mapped sequence on the basis of the cyclic shift parameters $\{\delta_{CS}\}$, then orthogonally transforming the cyclically shifted sequence, to acquire the sequence desired; specifically, the Inverse Fast Fourier Transform (including the shift of both positive and negative frequencies) may be applied.

Or, the cyclic shift in the time domain includes:

first, orthogonally transforming (e.g. via IFFT, including the shift of the positive and negative frequencies) the subcarrier-mapped sequence, then cyclically shifting the transformed sequence on the basis of the cyclic shift parameters $\{\delta_{CS}\}$, to acquire the sequence desired.

At step S05, the cyclic prefix CP is added to the desired sequence as acquired, to acquire a random access signal in the time domain.

At step S06, subsequent processing is performed on the random access signal, and then the processed random access signal is transmitted to a receiving end.

In an embodiment of the present invention, when the bandwidth of the physical channel is 20 MHz, the length of IFFT $N_{IFFT}=256$, wherein, the number of available subcarriers $N_u=224$, then, the length N of the sequence is determined as $N=N_u$.

In an embodiment of the present invention, the number of elements in the collection of cyclic shift parameters $\{\delta_{CS}\}$ is 8, then the cyclic shift parameters $\{\delta_{CS}\}$ may be set as $\{\delta_{CS}\}=\{0\ 32\ 64\ 96\ 128\ 160\ 192\ 224\}$ or $\{\delta_{CS}\}=\{0\ 43\ 86\ 129\ 172\ 215\}$.

The user station randomly selects a random access signal as the resource request signal, or generates a random access signal as the resource request signal according to the sequence index and the cyclic shift index allocated by CAP. The random access signal is employed as the resource request signal, and the difference between the random access signal and the resource request signal is that: the sequence index and the cyclic shift index during the generation of random access signal is randomly selected by each STA, and there is the potential risk of conflicting; but when the random access signal is employed as the resource request signal, which may be competitive or non-competitive, the generation of the competitive resource request signal is the same with that of the random access signal; while in the generation of the non-competitive resource request signal, the sequence index and the cyclic shift index used by an STA is allocated to the STA through the control channel by the CAP, and there is no possibility of conflicts. The random access and the resource request can be distinguished by the mode of time division or code division, for example.

Assuming the resource request and the random access of the system is time-division multiplexed in one uplink transmitting from, the resource request can use the same code resources as the random access. If both of the resource request and the random access are not time-division multiplexed, different code resources or cyclic shift parameters should be used to distinguish them.

For more apparently illustrating the principles, features and advantages of the present invention, the present invention is specifically described with the following embodiments.

A First Embodiment

In this embodiment, assuming the bandwidth of the physical channel is 20 MHz, Inverse Fast Fourier Transform (IFFT) is applied, and the length of IFFT $N_{IFFT}=256$, wherein, the number of available subcarriers $N_u=224$. Further, assuming the selected length of the sequence $N=N_u$, then, each random access sequence would occupy the 20 M bandwidth.

Figure 4:
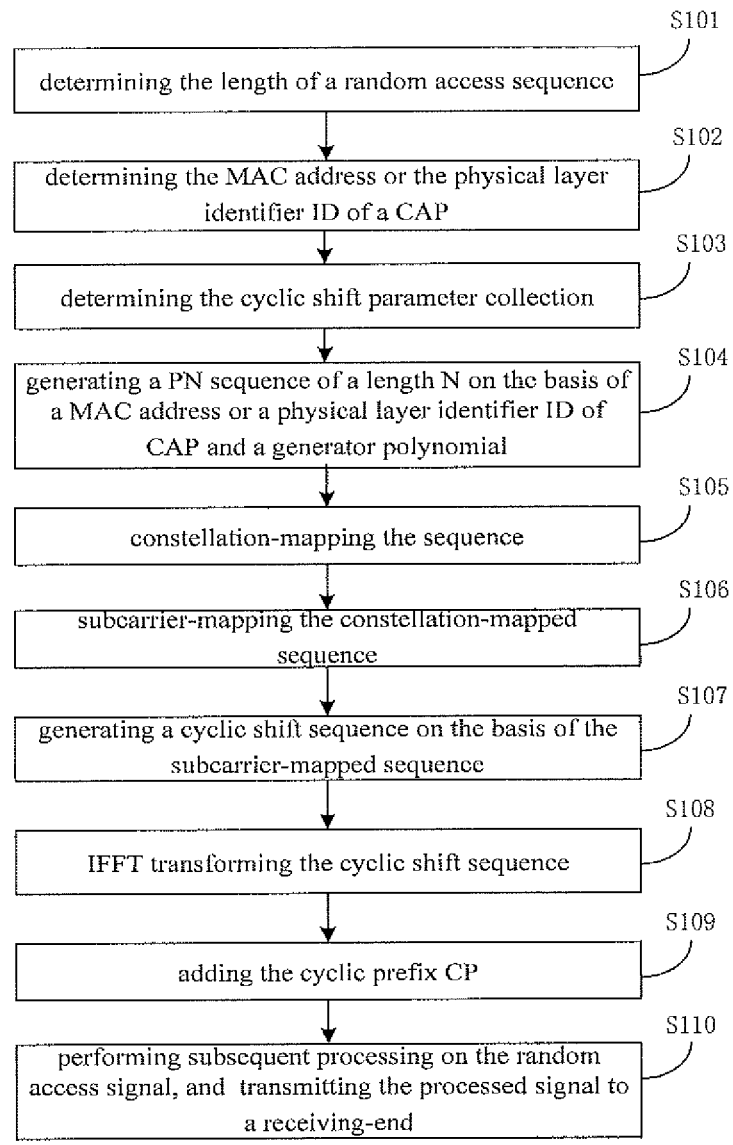
FIG. 4 is the flowchart of the communication method provided in an embodiment of the present invention.

The communication method for a wireless system as provided by this embodiment is illustrated in FIG. 4, and includes the following steps S101-S110.

At step S101, the length N of a random access sequence, the length $N_{IFFT}$ of IFFT, the number n of available random access sequences and the sequence collection $\{S\}$ are determined, where $N \leq N_u$ and $N_u$ denotes the number of available subcarriers. Here, N denotes the system configuration parameter, and has a value for example $$\frac{N_u}{4}, \frac{N_u}{2}, \text{ or } N_u.$$

As for $N_u$, n, $N_{IFFT}$, specifically, in this embodiment, the length of IFFT $N_{IFFT}=256$, where the number of available subcarriers $N_u=224$.

At step S102, the MAC address or the physical layer identifier ID of the CAP are determined.

Where, the MAC address of the CAP may be acquired from the system broadcast message, while the physical layer identifier ID of the CAP may be included in the system synchronization symbols.

At step S103, the collection of cyclic shift parameters $\{\delta_{CS}\}$ is determined.

The collection of cyclic shift parameters $\{\delta_{CS}\}$ is a system default parameter, or may be acquired from the system broadcast message.

The cyclic shift parameter and the cyclic prefix length may vary depending upon the application scene of the system.

Here, the application scene mainly refers to the coverage area of the system. Referring to the current system designed to support the coverage area with a radius of 100 m, the sum of the backhaul delay and the channel delay spread is about 1.46 μs, thus the length of CP is configured to be 1.6 μs; in this case, considering the time-domain sample number corresponding to the sum of the backhaul delay and the channel delay spread is about 30, the cyclic shift interval between the adjacent sequences should be greater than or equal to 30 samples; if the interval is set as 32 samples, the cyclic shift parameters $\{\delta_{CS}\}=\{0\ 32\ 64\ 96\ 128\ 160\ 192\ 224\}$; to extend the coverage of the system, for example, the radius of the coverage reaches 200 m, the sum of the backhaul delay and the channel delay spread should be about 2.13 µs, the length of CP can be extended to 2.4 µs; in this case, considering the time-domain sample number corresponding to the sum of the backhaul delay and the channel delay spread is about 42, the interval is set as 43, thus the cyclic shift parameters $\{\delta_{CS}\}=\{0\ 43\ 86\ 129\ 172\ 215\}$, and if over sampling is implemented at the transmitter, the cyclic shift parameters shall be multiplied by an over sampling coefficient.

At step S104, a PN sequence of a length N is generated on the basis of the MAC address or the physical layer identifier ID of CAP and a generator polynomial.

The desired PN sequence R may be generated on the basis of a generator polynomial. If the generator polynomial is $1+X^4+X^7+X^{15}$, as employed in Wimax, the block diagram showing the generation of the PN sequence is illustrated in FIG. 5, where [s0 s1 s2 s3 s4 s5 s6] denotes the least significant 7 bits of the MAC address or the physical layer identifier ID of the AP.

Figure 5:
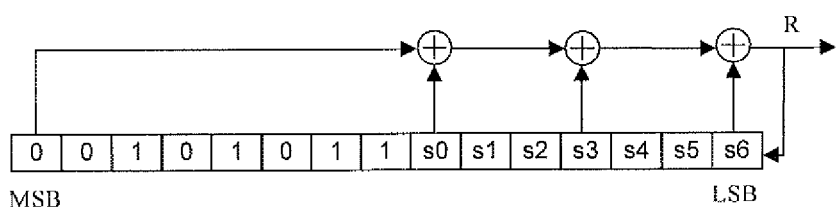
FIG. 5 is a block diagram showing the generation of a PN sequence according to an embodiment of the present invention.

If the least significant 7 bits of the MAC address or the physical layer identifier ID of the CAP are all 0, then the initial state of the Linear Feedback Register (LFSR) in FIG. 5 is [001010110000000], and the outputted pseudo-random binary sequence thereof is:

R=[0011000001000111000101010101011110 . . . ].

The cycle of the pseudo-random binary sequence is 32767. Then, the i-th available random access sequence corresponding to the CAP is:

$S_i=[R_{224\times(i-1)+1}R_{224\times(i-1)+2}\ldots R_{224\times i}]$, wherein, i=1, 2, . . . , n, $S_i\in\{S\}$.

If n=2, then S={$S_1$, $S_2$}, wherein $S_1$=[00110000010001110001010101011110010111010 1100000010101   01110110110011010011100001001011 10010100101001111111011111011001 011100111 011010 01000010000111100110101110011100001101111100110 1 11001111010111110110010000100111010111011100]

$S_2$=[11101000101111011010000000010111010100101 1000101101001110010010110010111111011000010 0 1101010101011011001101010000100010100001100011 00111001110011100000101000110010011001001011 10 111111111001001010100000 010000001011001111011111].

At step S105, the sequence $S_i(k)$ is constellation-mapped.

The acquired $S_i(k)$ is constellation-mapped according to equation (1), to acquire a sequence C(k)

$$C(k)=1-2\times S_i(k) \quad (1)$$

At step S106, the sequence C(k) acquired from the constellation-mapping is subcarrier-mapped;

Specifically, the sequence C(k) is subcarrier-mapped according to the method illustrated in FIG. 6, to acquire a sequence M(k).

At step S107, a cyclic shift sequence is generated on the basis of the subcarrier-mapped sequence.

Cyclicality shifting the subcarrier-mapped sequence according to equation (2) acquires a sequence T(k)

$$T(k) = M(k)e^{-j\frac{2\pi k\delta_{CS}}{N_{IFFT}}} \quad (2)$$

Wherein, $N_{IFFT}$ denotes the sample number of IFFT.

$$k \in \left[-\frac{N_{IFFT}}{2}, \frac{N_{IFFT}}{2}-1\right],$$

$\delta_{CS}$ denotes the cyclic shift parameter.

At step S108, IFFT transform is conducted on the cyclic shift sequence T(k).

Specifically, the transform is conducted according to the following equation:

$$t(l) = \frac{1}{\sqrt{N_{IFFT}}}\sum_{k=-N_{IFFT}/2}^{N_{IFFT}/2-1} T(k)e^{j\frac{2\pi kl}{N_{IFFT}}}, \quad (3)$$

$$k, l \in \left[-\frac{N_{IFFT}}{2}, \frac{N_{IFFT}}{2}-1\right]$$

At step S109, the cyclic prefix CP is added.

After the IFFT transforming of the cyclic shift sequence, the cyclic prefix CP is added, to acquire the time-domain random access signal, at this point, the baseband signal processing is accomplished.

At step S110, subsequent processing is performed on the random access signal, and the processed signal is transmitted to a receiving end.

The random access sequence may also be used as a resource request sequence, and be distinguished from the random access channel by means of time division or code division.

Referring to the system frame structure of the wireless communication system illustrated in FIG. 7, the resource request and the random access of the system is time division multiplexed on the same uplink transmitting frame, so the same code resources may be used for both the resource request and the random access.

A Second Embodiment

In this embodiment, the random access sequence is generated in the time domain.

The difference of the second embodiment from the implement scheme in the frequency domain as described in the first embodiment mainly is that: in the implement scheme in the frequency domain as provided in the first embodiment, the cyclic shift is carried out before IFFT, which is equivalent to that different phase rotations are carried out on various subcarriers; however, the implement scheme in the time domain as provided in this embodiment is carried out after IFFT, which corresponds to the cyclic shift of the time-domain samples.

In this embodiment, a generator polynomial different from that in Wimax is employed, for example, the longest linear feedback shift register sequence of $1+X^{11}+X^{15}$ is employed, the block diagram showing the generation of the PN sequence is illustrated in FIG. 8.

Assuming the least significant 7 bits of the MAC address or the physical layer identifier ID of the CAP are all Os, then the initial state of the Linear Feedback Register (LFSR) in FIG. 8 is [001010110000000], and the outputted pseudo-random binary sequence thereof is:

R=[1001101100010010010101010001101110 ... ].

Assuming n=2, then S={S₁S₂}, wherein

S₁=[1001101100010010010101000110111000100101000110001110100100101100111101111100011100010111011011001100001101000001111011101011111000001010101111010100001011010010110111111111111001000 0000011010010000110111110011101001011001001]

S₂=[11111100101011000110110011010101010000111000000 1011100110010110010000011110010010111111010111101001010101101111100001110010111111101011101000101010001100010001001001000000011011001000110101001000101100111000011100010111111011].

The subsequent constellation-mapping, subcarrier-mapping and IFFT transforming is basically the same as that in the first embodiment, and is not repeated hereinafter.

A Third Embodiment

Figure 9:
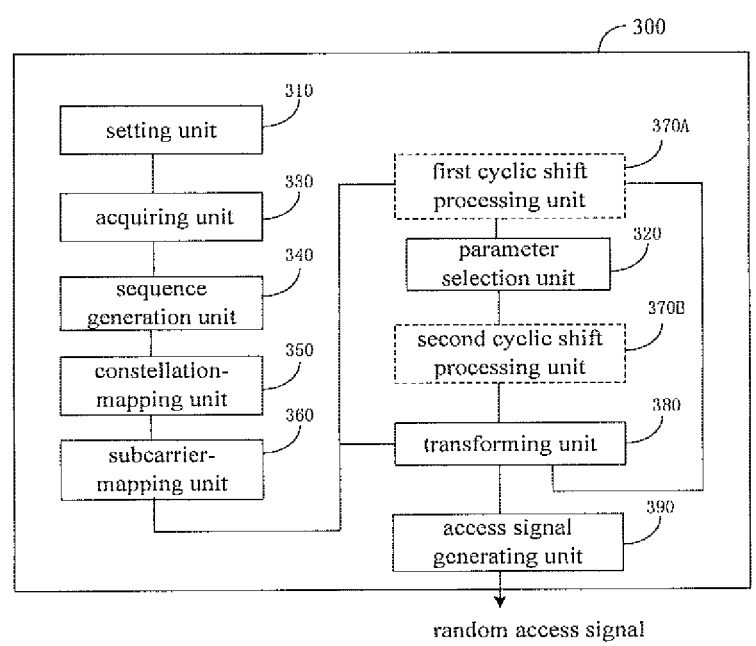
FIG. 9 illustrates the constitution of the communication system provided in an embodiment of the present invention.

A wireless communication system 300 is provided in this embodiment, as illustrated in FIG. 9, the system includes:

a setting unit 310, used to determine the length N of a random access sequence on the basis of system configuration information, where N≤$N_u$ (for example, the value of N may be $$\frac{N_u}{4}, \frac{N_u}{2}, N_u \text{ etc.}\Big),$$

and $N_u$ denotes the number of available subcarriers;

a parameter selection unit 320, used to determine a collection of cyclic shift parameters {$\delta_{CS}$} on the basis of the system configuration information;

an acquiring unit 330, used to acquire a MAC address or a physical layer identifier ID of a central access point CAP;

a sequence generation unit 340, used to generate a PN sequence of a length N on the basis of the MAC address or the physical layer identifier ID of the CAP and a predetermined generator polynomial;

a constellation-mapping unit 350, used to constellation-map the generated PN sequence to acquire a new sequence, and then provide the new sequence to a subcarrier-mapping unit for subcarrier mapping;

a subcarrier-mapping unit 360, used to subcarrier-map the PN sequence;

a first cyclic shift processing unit 370A, used to cyclically shift the subcarrier-mapped sequence on the basis of the cyclic shift parameters {$\delta_{CS}$}; or a second cyclic shift processing unit 370B, used to cyclically shift the orthogonally transformed sequence on the basis of the cyclic shift parameters {$\delta_{CS}$}, to acquire the desired sequence;

a transforming unit 380, used to orthogonally transform (e.g. IFFT, including the shift of the positive and negative frequencies) the sequence subcarrier-mapped by the subcarrier-mapping unit 360, and then output the transformed sequence to the second cyclic shift processing unit; or orthogonally transform (e.g. IFFT, including the shift of the positive and negative frequencies) the sequence cyclically shifted by the first cyclic shift processing unit, to acquire the desired sequence;

an access signal generating unit 390, used to add a cyclic prefix CP to the desired sequence as acquired, to acquire the random access signal in the time domain;

a modulation unit (not shown), used to modulate the random access signal; and a transmitting unit (not shown), used to transmit the modulated random access signal to a receiving end.

The principle and process of the wireless communication system provided in this embodiment, is basically the same with the above method, which is not repeated hereinafter.

In brief, in the wireless communication system and the communication method thereof provided in the present invention, the PN sequence and the cyclic shift sequence thereof are employed as the random access sequence. By the specific design of the random access sequence, the adjustment of the sequence length, the cyclic shift parameter, the cyclic prefix length, etc. provides the improved support for the random access to the wireless communication system, especially for the random access to the mid-short distance wireless communication system, and provides improved system stability and reliability.

Although the present invention to the preferred embodiments disclosed above, but which are not intended to limit the present invention, any person skilled in the art without departing from the spirit and scope of the invention, can make changes and modifications possible, the present invention is therefore the scope of the present invention should be defined by the scope of claims prevail.

The invention claimed is:

1. A communication method, comprising:
   determining a length N of a random access sequence on the basis of system configuration information, wherein N≤$N_u$ and $N_u$ denotes the number of available subcarriers;
   determining a collection of cyclic shift parameters {$\delta_{CS}$} and a cyclic prefix CP on the basis of a system coverage area as designed;
   acquiring a media access control layer MAC address or physical layer identifier ID of a central access point CAP, generating a PN sequence of a length N on the basis of the MAC address or physical layer identifier ID of the CAP and a predetermined generator polynomial, and constellation-mapping and subcarrier-mapping the PN sequence;
   cyclically shifting the constellation-mapped and subcarrier-mapped PN sequence on the basis of the cyclic shift parameters {$\delta_{CS}$}, then orthogonally transforming the cyclically shifted sequence to acquire the desired sequence; or orthogonally transforming the subcarrier-mapped PN sequence, and then cyclically shifting the transformed sequence on the basis of the cyclic shift parameters {$\delta_{CS}$} to acquire the desired sequence;
   adding the cyclic prefix CP to the acquired sequence to acquire a random access signal in the time domain; and
   performing subsequent processing on the random access signal, and then transmitting the processed random access signal to a receiving end.

2. The communication method of claim 1, wherein, the orthogonally transform is Inverse Fast Fourier Transform IFFT.

3. The communication method of claim 2, wherein, if the bandwidth of a physical channel is 20 MHz, the length $N_{IFFT}$ of IFFT is adopted, and the length of the sequence is selected as N=$N_u$.

4. The communication method of claim 1, wherein, the determining the collection of cyclic shift parameters {$\delta_{CS}$} on the basis of the system coverage area as designed specifically comprises:
   estimating a backhaul delay on the basis of the system coverage area, and estimating the channel delay spread;
   determining the corresponding time-domain sample number on the basis of the backhaul delay and the channel delay spread;

selecting a value greater than or equal to the time-domain sample number as a cyclic shift interval between the adjacent sequences; and setting the collection of cyclic shift parameters $\{\delta_{CS}\}$ on the basis of the cyclic shift interval.

5. The communication method of claim 4, wherein, when the system coverage has a radius of 100 m, the cyclic shift interval between the adjacent sequences is selected to be 32 samples, and the cyclic shift parameters are determined as $\{\delta_{CS}\}=\{0\ 32\ 64\ 96\ 128\ 160\ 192\ 224\}$; and when the system coverage is 200 m, the cyclic shift interval between the adjacent sequences is selected to be 43 samples, and the cyclic shift parameters are determined as $\{\delta_{CS}\}=\{0\ 43\ 86\ 129\ 172\ 215\}$.

6. The communication method of claim 1, wherein, determining the cyclic prefix CP on the basis of the system coverage area as designed specifically comprises:

estimating a backhaul delay on the basis of the system coverage area, and estimating the channel delay spread; and setting the value of the cyclic prefix CP to be greater than the sum of the backhaul delay and the channel delay spread.

7. The communication method of claim 1, wherein,
the length N of the random access sequence is $$\frac{N_u}{4},\ \frac{N_u}{2}\ \text{or}\ N_u.$$

8. The communication method of claim 1, also comprising:

generating the random access signal, by a user station, from a sequence index and a cyclic shift index allocated by the CAP, as a resource request signal.

9. A wireless communication system, comprising:

a setting unit, used to determine a length N of a random access sequence on the basis of system configuration information, wherein $N \leq N_u$ and $N_u$ denotes the number of available subcarriers;

a cyclic shift parameter selection unit, used to determine a collection of cyclic shift parameters $\{\delta_{CS}\}$ on the basis of system configuration information;

an acquiring unit, used to acquire a MAC address or a physical layer identifier ID of a central access point CAP;

a pseudo-random sequence generating unit, used to generate a PN sequence of a length N on the basis of the MAC address or the physical layer identifier ID of the CAP and a predetermined generator polynomial;

a constellation-mapping unit, used to constellation-map the generated PN sequence to acquire a new sequence, and providing the new sequence to a subcarrier-mapping unit;

the subcarrier-mapping unit, used to subcarrier-map the PN sequence;

a first cyclic shift processing unit, used to cyclically shift the subcarrier-mapped sequence on the basis of the cyclic shift parameters $\{\delta_{CS}\}$; or a second cyclic shift processing unit, used to cyclically shift the orthogonally transformed sequence on the basis of the cyclic shift parameters $\{\delta_{CS}\}$, to acquire the desired sequence;

a transforming unit, used to orthogonally transform the subcarrier-mapped sequence, and then provide the transformed sequence to the second cyclic shift processing unit; or orthogonally transform the sequence cyclically shifted by the first cyclic shift processing unit, to acquire the desired sequence;

an access signal generating unit, used to add a cyclic prefix CP to the desired sequence as acquired, to acquire a time-domain random access signal;

a modulation unit, used to modulate the random access signal; and a transmitting unit, used to transmit the modulated random access signal to a receiving end.

10. The system of claim 9, wherein,
the orthogonal transform is Inverse Fast Fourier Transform IFFT.

11. The system of claim 9, wherein,
the length N of the random access sequence is $$\frac{N_u}{4},\ \frac{N_u}{2}\ \text{or}\ N_u.$$

* * * * *